Patented July 10, 1951

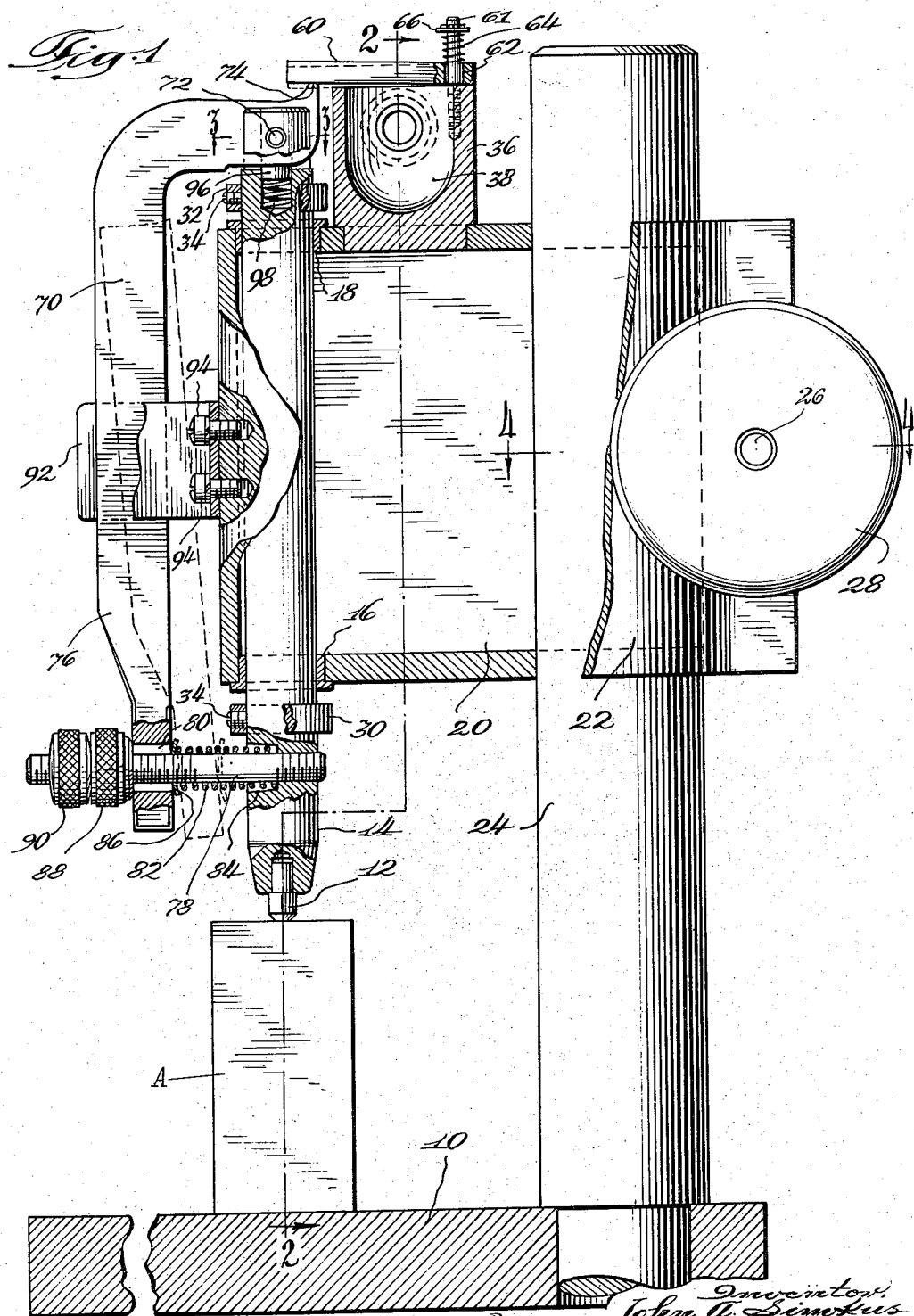

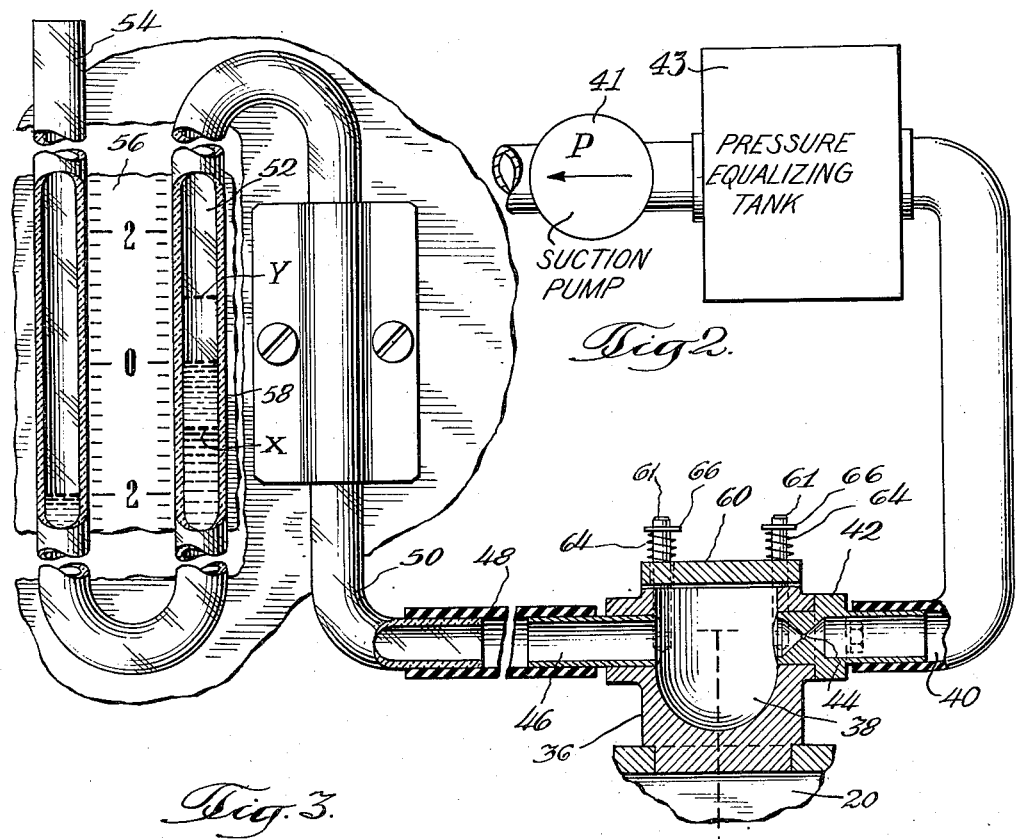
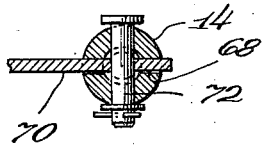
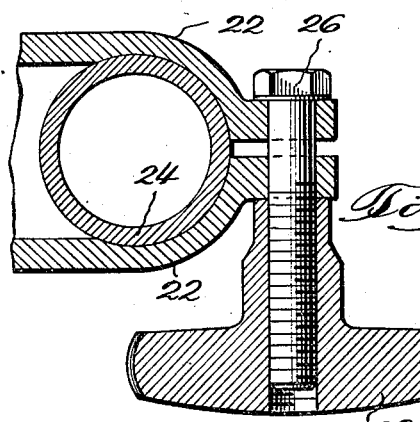
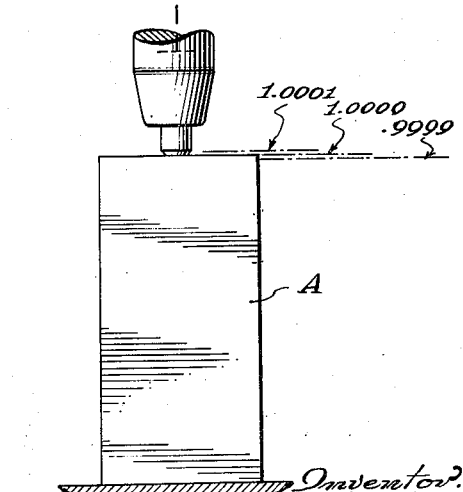

2,560,194

UNITED STATES PATENT OFFICE 2,560,194

PNEUMATIC TYPE OPPOSED CONTACT GAUGE

John A. Simkus, Chicago, Ill.

Application August 9, 1945, Serial No. 609,795

7 Claims. (Cl. 33—147)

This invention relates to gaging devices and particularly to the type of gage which is employed in the inspection of manufactured parts to determine how accurately they conform to the required dimensions.

One object of the invention is to provide a gage for this purpose having indicating means which is extremely sensitive to movement of the gaging member.

Another object of the invention is to provide a gaging device adapted to employ a manometer as the indicating element.

It is also an object of the invention to provide an adjustable connection between the gaging member of the device and the manometer affording an extremely fine adjustment whereby the indicating element may be brought to a desired position on the scale which is to serve as a zero reading, the adjustment being continuous throughout its range and provided with conveniently accessible manual adjusting means.

More specifically, it is an object of the invention to arrange a manometer in connection with a constant source of suction or partial vacuum, providing in the connection a chamber having a valve shiftable to form a variable leak by which the suction applied to the manometer may be partially dissipated, and to provide a movable gaging member with means by which its movement is transmitted to the valve so that the amount of this movement is registered by a corresponding shifting of the indicating element of the manometer.

Other objects and advantages of the invention will appear from the following description taken in connection with the drawings, in which:

Fig. 1 is a side elevation of a gaging device embodying this invention with parts broken away or shown in section;

Fig. 2 is a fragmentary front elevation partly in section as indicated at line 2—2 on Fig. 1 and showing the manometer and its scale together with the operative connection between the manometer and the gaging device;

Fig. 3 is a detail section taken as indicated at line 3—3 on Fig. 1;

Fig. 4 is a detail section taken as indicated at line 4—4 on Fig. 1.

While there is shown and described herein certain structure illustrating the invention, it is to be understood that the invention is not limited thereto or thereby but may assume numerous other forms and includes all modifications, variations and equivalents coming within the scope of the claims.

In the drawings Fig. 1 shows a gaging device having a bed or base plate 10 with an accurately finished flat upper surface on which the article to be measured is placed. Such an article is illustrated at A, having an accurate dimension as, for example, 1″ between the upper surface of the base 10 and the contact end of the gage pin 12 carried by the gaging plunger 14. The plunger 14 is slidable vertically through a limited range in bushings 16 and 18 which are supported in a cast bracket member 20 of hollow construction, which includes arcuate jaw portions 22, 22 embracing a supporting post or column 24. The post 24 is secured rigidly in the base plate 10 upstanding therefrom and the bracket 20 is clamped at any convenient point in the height of the post 24 by means of a clamp screw 26 and hand wheel 28 threaded thereon as clearly indicated in Fig. 4.

The gaging plunger 14 is fitted with stop collars 30 and 32 which may be secured by set screws 34 as shown in Fig. 1 and which limit the range of its vertical movement in the bracket 20. Said bracket supports a block 36 in which there is formed a vacuum chamber 38 connected by a tube 40 with a source of constant suction such as is usually available in a testing laboratory in which the gage is to be employed. The suction may be produced in any well-known manner, as by means of a suction pump 41 (Fig. 2), preferably with an equalizing tank 43 or chamber interposed in the line or, if desired, it can be secured by arranging an aspirator in an air pressure line. To minimize the effect of even slight variations in the suction acting through the tube 40, a fitting 42 is interposed between the tube 40 and the chamber 38 and this fitting is formed with a restriction port 44 preferably by making the bore of the fitting of two conical portions approximating the form of a venturi. A nipple 46 and a section of flexible tubing 48 serve to connect the chamber 38 with the tube 50 of the manometer shown in Fig. 2. As illustrated, the manometer is of the U-tube type having a leg 52 connected to the inleading tube 50, while the leg 54 extending parallel to the leg 52 is open to the atmosphere at its upper end. A scale 56 is mounted in the usual manner between the two legs of the U-tube, preferably with some capacity for vertical adjustment by any conventional means (not shown). Any suitable liquid such as mercury, or oil or water, as indicated at 58, occupies the bend of the U-tube which connects the legs 52 and 54 and extends to some distance in each of said legs; the level is altered by changes in pressure applied through the inleading portion 50 of the manometer so that with the arrangement shown in Fig. 2 these changes in level of the liquid in leg 52 will follow changes in the pressure vacuum maintained in the chamber 38 and may be noted by reference to the scale 56.

The vacuum chamber 38 is fitted with a vent valve 60 in the form of a flat plate which is accurately finished to fit on to the upper edges of the side walls of the chamber 38 and which is held in position by a pair of upstanding pins 61, 61 extending through holes 62 in the plate 60. These holes fit the pins loosely so as to permit the valve 60 to be tilted upwardly through a limited range. Light springs 64, 64 react between the upper surface of the plate and washers 66 which are secured to the pins 61 to retain the valve plate thereon.

The upper end of the gaging plunger 14 is formed with a transverse slot 68 to accommodate a lever 70 which is fulcrumed in the slot 68 upon a pivot pin 72 extending through the plunger 14. The adjacent end portion of the lever 70 is formed with a reduced terminal 74 for engagement with the underside of the portion of the valve plate 60 which extends beyond the chamber 38. This is the portion of the plate remote from the locating pins 61, 61 so that it is free to be lifted out of contact with the upper edge of the wall of the chamber 38 to the position shown in Fig. 1. Such opening movement of the valve 60 will occur in response to upward movement of the gaging plunger 14 in its bearings in the bracket 20 and will serve to partially vent the chamber 38, reducing the vacuum therein and causing an alteration in the level of the liquid 58 in the tube 52 of the manometer.

The bearing point 74 is at the end of the short arm of the lever 70; the lever is bent somewhat in the form of a bell crank so that its longer arm 76 extends downwardly and approximately parallel to the gaging plunger 14. Near its lower end the plunger is provided with a threaded stud 78 which extends through a clearance opening 80 in the arm 70. A spring 82 is coiled about the stud 78 and occupies the space between the plunger 14 and the arm 76 of the lever 70, one end of the spring being disposed in a pocket 84 formed in the face of the plunger 14 and the other end bearing against a washer 86 which overlaps the clearance opening 80. A knurled adjusting nut 88 on the threaded end of the stud 78 engages the outer face of the lever arm 76 and a lock nut 90 serves to retain the nut 88 at any adjusted position on the stud. The lever arm 76 is steadied and guided between parallel faces of a guide bracket 92 secured by screws 94 to the front face of the supporting bracket 20. Although the pivot pin 72 is fitted accurately in the plunger 14 and in the lever 70, a plug 96 is disposed slidably in a bore in the upper end of the plunger 14 and a spring 98 urges the plug constantly against the lower edge of the lever 70 to take up any possible play at the pivot 72.

To prepare the gage for use, a part of standard size, say, for example, exactly 1" in height, will be placed on the upper surface of the base 10 as indicated at A in Fig. 1 and the bracket 20 will be adjusted on the column 24 to bring the contact pin 12 into engagement with the upper surface of the block A. This will lift the plunger 14 slightly so that its stop collar 32 is lifted off the bushing 18 and, depending upon the position at which the lever 70 happens to be adjusted, it may or may not open the valve 60. The bracket 20 then is clamped tightly to the column 24 and the nut 88 is adjusted to swing the lever 70 to a position at which its terminal 74 raises the valve 60 off its seat just enough to bring the level of the liquid 58 in the tube 52 to a chosen zero reading. This may happen to be the zero mark on the scale 56 as shown in Fig. 2, or it may be any other selected scale reading which is convenient in view of the quantity of this indicating liquid 58 which the manometer happens to contain. It will be understood that if both legs 52 and 54 of the manometer are subjected to atmospheric pressure, the level of the liquid in both legs will be the same, but upon a reduction of the pressure applied to the leg 52, the liquid therein will rise, causing the level in the tube 54 to fall correspondingly. With the valve 60 in closed position, the liquid in the tube 52 will rise to a maximum height corresponding to the particular value of the suction or partial vacuum maintained through the tube 40. In Fig. 2, it is assumed that the reading in the tube 52 at atmospheric pressure will be at X and that the reading for the full vacuum available through the tube 40 will be at Y. The scale 56 therefore is adjusted to bring a convenient scale reading—in this instance the zero reading—about midway between the points X and Y, and then with the block A of standard dimension disposed between the base 10 and the gage pin 12, the nut 88 is adjusted to vary the opening of the valve 60 by rocking the terminal point 74 of the lever 70 about its pivot 72 until the partial vacuum in the chamber 38 is thus reduced sufficiently to bring the liquid level in the tube 52 exactly to the zero reading.

With the gage and the manometer thus adjusted, a block to be tested is substituted for the standard block A. If its dimension is slightly less than 1", the plunger 14 will assume a position slightly lower than with the standard block A in place and the valve 60 will be lowered toward its closed position, reducing the leakage of air into the chamber 38 and increasing the vacuum so as to cause the liquid 58 in the tube 52 to rise above the zero reading. If the block under test is slightly oversize, the plunger 14 will be lifted above the position which it assumed when the standard block A was in place, and the valve 60, being open more widely, will cause a greater leakage of air into the chamber 38, reducing the value of the suction which is applied from the chamber to the tube 52 and permitting the liquid level to fall somewhat below the zero reading. The purpose of the gaging operation is not to determine the exact dimension of a part under test, but rather to learn whether it is under or over the standard size and whether the variance is within the limits of tolerance established for that particular part. The readings on the scale 56 which correspond to the extreme limits of tolerance may be determined in advance by employing standard blocks having these limiting dimensions. Suppose that a tolerance of .0001" above or below the standard dimension is permissible and that a block 1.0001" in height causes the level in the manometer tube 52 to drop to a scale reading of 3, while a block having a dimension 0.9999 produces a manometer reading of 3 above the zero of the scale. Then any tested part which shifts the manometer level by less than 3 scale marks from the zero reading will be within the limits of tolerance.

It will be evident that the apparatus embodying this invention as herein shown is mechanically simple and operatively inexpensive to manufacture notwithstanding its extreme sensitivity. The manometer portion of the apparatus need not be closely associated with the gaging device itself since the flexible tubing 48 may be of considerable length and the manometer may be rigidly carried by a fixed support while the gaging device will have a limited range of movability about the desk or bench upon which it is placed.

I claim:

1. A gage comprising a base having a surface to support a part to be measured, a support connected with said base, a gaging member carried by said support for movement toward and from said base, a body adjacent the gaging member having a chamber and means maintaining in said chamber a pressure other than atmospheric pressure, said body having an aperture communicating with said chamber, a vent valve positioned for opening and closing said aperture, a lever including a longer arm and a shorter arm pivotally carried by said gaging member, the shorter arm of the lever engaging the vent valve, and means anchoring the longer arm of said lever to the gaging member and adjustable to vary the position of the vent valve with relation to said gaging member.

2. A gage comprising a base with a column upstanding therefrom, said base having a surface to support a part to be measured, a bracket adjustable vertically on said column, a gaging plunger slidable in said bracket toward and from the base, a body having a chamber carried on said bracket adjacent the plunger, said body having an aperture communicating with said chamber, a vent valve positioned for opening and closing said aperture, a bell crank lever fulcrumed in the end of the plunger remote from said base and having a shorter arm with a terminal operatively engaging said vent valve and a longer arm extending laterally adjacent the plunger, and threaded adjusting means securing said longer arm to the plunger and operable to rock the lever on its fulcrum to vary the opening of the valve at any given position of the plunger.

3. A gage comprising a base with a column upstanding therefrom, said base having a surface to support a part to be measured, a bracket adjustable vertically on said column, a gaging plunger slidable in said bracket toward and from the base, a body having a chamber carried on said bracket adjacent the plunger, said body having an aperture communicating with said chamber, a vent valve positioned adjacent the body for opening and closing said aperture, a bell crank lever fulcrumed in the end of the plunger remote from said base and having a shorter arm with a terminal operatively engaging said vent valve and a longer arm extending laterally adjacent the plunger, a threaded stud extending from said plunger through the longer arm of the lever, a spring interposed between the plunger and said longer arm, and an adjusting nut on said stud bearing against the lever.

4. A gage comprising a base having a surface to support a part to be measured, a gaging member movable toward and from said surface, means providing an upwardly open chamber adjacent the gaging member, a flat plate seating over the upper edges of the chamber, and means loosely retaining said plate in position with a portion of the plate projecting into the path of said gaging member to be unseated thereby.

5. A gage comprising a base having a surface to support a part to be measured, a support connected with the base, a gaging member mounted on said support for movement toward and from said base, a body adjacent said gaging member having a chamber and means maintaining in said chamber a pressure other than atmospheric pressure, said body having an aperture communicating with said chamber, a vent valve positioned for opening and closing said aperture, said gaging member including an adjustable lever through which its movement is transmitted to the vent valve, a pressure responsive indicator connected with said chamber, and a scale traversed by said indicator in accordance with movements of the gaging member, together with means for shifting said adjustable lever to a position at which the vent valve is opened when a part of standard dimension is interposed between the gaging member and said surface of the base, said valve being opened to a greater extent by the substitution of an oversized part and to a lesser extent when an undersized part is placed in position to be measured.

6. In a gage having an indicator responsive to fluid pressure and having pumping means for maintaining a fluid at a pressure other than atmospheric pressure, the combination of a base having a surface to support a part to be measured, a gaging member, means supporting the gaging member for movement toward and from the base, a body having a chamber adjacent the gaging member, said body having an aperture communicating with said chamber, a vent valve positioned for opening and closing said aperture, said gaging member including an adjustable lever through which its movement is transmitted to the vent valve, means connecting said chamber with the indicator, means connecting said chamber with the pumping means, and means for delicately and accurately shifting said adjustable lever to a position at which the vent valve is opened when a part of standard dimensions is interposed between the gaging member and the supporting surface of the base, said shifting means being operable to vary the degree of valve opening and to produce a definite reading of the indicator corresponding to said standard dimension, whereby undersized or oversized parts when inserted between the base and the gaging member will produce corresponding readings of the indicator deviating accordingly from the said standard reading.

7. In a gage having an indicator responsive to fluid pressure and pumping means for maintaining a fluid at a pressure other than atmospheric pressure, the combination of a base having a surface to support a part to be measured, a gaging member, means supporting the gaging member for movement toward and from said surface, means adjacent the gaging member providing a chamber having an opening, a flat cover plate seating over the opening, means loosely retaining said plate in a position with a portion of the plate projecting into the path of said gaging member to be unseated thereby, means connecting the chamber with the indicator, and means connecting the chamber with the pumping means.

JOHN A. SIMKUS.

REFERENCES CITED

The following references are of record in the file of this patent:

UNITED STATES PATENTS

| Number | Name | Date |
|---|---|---|
| 862,126 | Aszman | Aug. 6, 1907 |
| 1,901,966 | Hoffman et al. | Mar. 21, 1933 |
| 2,007,507 | Steiner | July 9, 1935 |
| 2,077,525 | Mennesson | Apr. 20, 1937 |
| 2,357,569 | Wright et al. | Sept. 5, 1944 |
| 2,369,319 | Smith | Feb. 13, 1945 |
| 2,374,154 | Moore | Apr. 17, 1945 |
| 2,375,600 | Wattebot | May 8, 1945 |
| 2,397,494 | Kuppersmith | Apr. 2, 1946 |

FOREIGN PATENTS

| Number | Country | Date |
|---|---|---|
| 341,365 | Great Britain | Jan. 15, 1931 |
| 519,551 | Great Britain | Mar. 29, 1940 |